US007300985B2

(12) United States Patent
Grootaert et al.

(10) Patent No.: US 7,300,985 B2
(45) Date of Patent: Nov. 27, 2007

(54) FLUOROPOLYMERS HAVING PENDANT AMIDOXIME OR AMIDRAZONE STRUCTURES

(75) Inventors: Werner M. A. Grootaert, Oakdale, MN (US); Klaus Hintzer, Kastl (DE); Kai Helmut Lochhaas, Neuoetting (DE); Franz Maerz, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 407 days.

(21) Appl. No.: 11/018,539

(22) Filed: Dec. 21, 2004

(65) Prior Publication Data
US 2006/0135700 A1 Jun. 22, 2006

(51) Int. Cl.
*C08F 8/32* (2006.01)
(52) U.S. Cl. .................. 525/326.2; 525/374; 525/380; 526/247; 526/248
(58) Field of Classification Search ............. 525/326.2, 525/374, 380; 526/247, 248
See application file for complete search history.

(56) References Cited

U.S. PATENT DOCUMENTS

| 3,467,638 | A |   | 9/1969  | Pattison          |         |
|-----------|---|---|---------|-------------------|---------|
| 3,682,872 | A |   | 8/1972  | Brizzolara et al. |         |
| 4,281,092 | A |   | 7/1981  | Breazeale         |         |
| 4,622,366 | A |   | 11/1986 | Sugo et al.       |         |
| 4,833,212 | A |   | 5/1989  | Yamada et al.     |         |
| 4,882,390 | A |   | 11/1989 | Grootaert et al.  |         |
| 5,268,405 | A |   | 12/1993 | Ojakaar et al.    |         |
| 5,554,680 | A |   | 9/1996  | Ojakaar           |         |
| 5,565,512 | A |   | 10/1996 | Saito et al.      |         |
| 5,585,449 | A |   | 12/1996 | Arcella et al.    |         |
| 5,605,973 | A | * | 2/1997  | Yamamoto et al.   | 525/326.3 |
| 5,621,145 | A |   | 4/1997  | Saito et al.      |         |
| 5,637,648 | A | * | 6/1997  | Saito et al.      | 525/326.3 |
| 5,700,879 | A |   | 12/1997 | Yamamoto et al.   |         |
| 5,767,204 | A |   | 6/1998  | Iwa et al.        |         |
| 6,255,536 | B1|   | 7/2001  | Worm et al.       |         |
| 6,281,296 | B1|   | 8/2001  | MacLachlan et al. |         |
| 6,294,627 | B1|   | 9/2001  | Worm et al.       |         |
| 6,333,078 | B1|   | 12/2001 | Sugo et al.       |         |
| 6,657,012 | B2|   | 12/2003 | Grootaert et al.  |         |
| 6,657,013 | B2|   | 12/2003 | Grootaert et al.  |         |
| 6,720,360 | B1|   | 4/2004  | Grootaert et al.  |         |
| 6,803,425 | B2|   | 10/2004 | Hintzer et al.    |         |
| 6,844,388 | B2|   | 1/2005  | Grootaert et al.  |         |

FOREIGN PATENT DOCUMENTS

| EP | 0 661 304 A1 | 7/1995 |
| EP | 0 769 521 A1 | 4/1997 |
| EP | 0 784 064 A1 | 7/1997 |

OTHER PUBLICATIONS

"The Chemistry of Amidines and Imidates" (S. Patai, Ed., John Wiley & Sons, Ltd., vol. 1, pp. 494-513 (1975).
Yu et al., "Amidoximation of the Acrylonitrile Polymer Grafted on Poly(Tetrafluoroethylene-*co*-hexafluoropropylene) Films and Its Relevance to the Electroless Plating of Copper", Langmuir, 2002, vol. 18, pp. 10221-10230.
Okamoto et al., "Amidoxime-Group-Containing Adsorbents for Metal Ions Synthesized by Radiation-Induced Grafting", Journal of Applied Polymer Science, 1985, vol. 30, 2967-2977.
Omichi et al., "Effect of Ultrasonic Irradiation on the Recovery of Uranium from Seawater and Adsorbents", Separation Science and Technology, 1988, vol. 23 (14&15), pp. 2445-2450.
Omichi et al., "A New Type of Amidoxime-Group-Containing Adsorbent for the Recovery of Uranium Seawater. II. Effect of Grafting of Hydrophilic Monomers", Separation Science and Technology, 1986, vol. 23 (3), pp. 299-313.
Omichi et al., "A New Type of Amidoxime-Group-Containing Adsorbent for the Recovery of Uranium from Seawater. III. Recycle Use of Adsorbent", Separation Science and Technology, 1986, vol. 21 (6&7), pp. 563-574.
Omichi et al., "A New Type of Amidoxime-Group-Containing Adsorbent for the Recovery of Uranium from Seawater", Separation Science and Technolgoy, 1985, vol. 20 (2&3), pp. 163-178.

* cited by examiner

*Primary Examiner*—Bernard Lipman
(74) *Attorney, Agent, or Firm*—Dena M. Ehrich; C. Michael Geise

(57) ABSTRACT

A fluoropolymer having pendant amidoxime groups, pendant amidrazone groups, or combinations thereof is provided. Also provided are methods of making such fluoropolymers, and compositions and articles containing such fluoropolymers.

15 Claims, No Drawings

US 7,300,985 B2

FLUOROPOLYMERS HAVING PENDANT AMIDOXIME OR AMIDRAZONE STRUCTURES

TECHNICAL FIELD

This invention relates to fluoropolymers having pendant amidoxime groups, pendant amidrazone groups, or combinations thereof. The invention also relates to methods of making, and articles containing, such fluoropolymers.

BACKGROUND

Fluorine-containing polymers (i.e., "fluoropolymers") are a commercially useful class of materials. Fluoropolymers include, e.g., crosslinked fluoroelastomers, uncrosslinked fluoroelastomer gums, and semi-crystalline fluoroplastics. Generally, fluoroelastomers exhibit significant tolerance to high temperatures and to harsh chemical environments. Consequently, they are particularly well adapted for use as seals, gaskets, O-rings, and other molded parts in systems that are exposed to elevated temperatures and/or harsh chemicals. Such parts are widely used in the chemical processing, semiconductor, aerospace, and petroleum industries, among others.

Fluoroelastomers often include a cure-site component to facilitate cure in the presence of a catalyst. One class of useful cure-site components includes nitrile group-containing monomers, which, in the presence of catalysts, form triazines. These cure-catalysts are typically organotin catalysts, ammonium salts, or ammonia-generating compounds. Such catalysts, however, may be toxic, and/or may release considerable amounts of ions such as undesirable extractable metal residues in the cured materials.

SUMMARY

In one aspect, the present invention relates to a fluoropolymer comprising first interpolymerized cure site units, wherein the cure site units have at least one pendant amidoxime group, pendant amidrazone group, or combinations thereof. In some embodiments, the fluoropolymer comprises interpolymerized units derived from at least one monomer selected from tetrafluoroethylene, chlorotrifluoroethylene, $CF_2=CF-R_f^1$, $CF_2=CF-O-R_f^2$, $CF_2=CF-CFX-O-R_f^2$, and $CH_2=CR_2$, wherein $R_f^1$ is a perhaloalkyl, $R_f^2$ is perhaloalkyl or a perhaloalkoxyalkyl, X is F or $R_f^2$, and each R is independently selected from the group consisting of hydrogen, a halogen, or an aliphatic group; wherein the aliphatic group(s) may have one or more halogen substituent(s).

In another aspect, the present invention relates to a fluoropolymer comprising first interpolymerized cure site units, wherein the cure site units have at least one pendant amidoxime group, pendant amidrazone group, or combinations thereof; and second interpolymerized cure site units. In some embodiments, the second interpolymerized cure site units have a reactive group selected from a nitrile group, an imidate group, a pentafluorophenoxy group, bromine, iodine, and combinations thereof. In some embodiments, the molar ratio of the first interpolymerized cure site units to the second interpolymerized cure site units is between about 0.25 and about 4.

In another aspect, the present invention provides an article comprising a fluoropolymer comprising first interpolymerized cure site units, wherein the cure site units have at least one pendant amidoxime group, pendant amidrazone group, or combinations thereof. In some embodiments, the article is a hose, a hose lining, a seal, a gasket, or an O-ring. In some embodiments, the fluoropolymer is at least partially cured.

In another aspect, the present invention provides a method of making an article comprising providing a fluoropolymer comprising first interpolymerized cure site units, wherein the cure site units have at least one pendant amidoxime group, pendant amidrazone group, or combinations thereof, shaping the fluoropolymer, and optionally curing the shaped fluoropolymer.

In yet another aspect, the present invention provides a method of making a fluoropolymer having interpolymerized cure site units, wherein the cure site units have at least one pendant amidoxime group, pendant amidrazone group, or combinations thereof. In some embodiments, the method comprises (i) providing a fluoropolymer having one or more interpolymerized units having a reactive group; and (ii) converting at least reactive group into a pendant amidoxime and/or pendant amidrazone group. In some embodiments, the reactive group is a nitrile group. In some embodiments, the conversion of the reactive group is carried out in the presence of a swelling agent. In some embodiments, the method comprises (i) providing a cure site monomer having pendant amidoxime group(s), pendant amidrazone group(s), a salt thereof, or combinations thereof; and (ii) copolymerizing the cure site monomer with at least one monomer selected from tetrafluoroethylene, chlorotrifluoroethylene, $CF_2=CF-R_f^1$, $CF_2=CF-O-R_f^2$, $CF_2=CF-CFX-O-R_f^2$, and $CH_2=CR_2$, wherein $R_f^1$ is a perhaloalkyl, $R_f^2$ is perhaloalkyl or a perhaloalkoxyalkyl, X is F or $R_f^2$, and each R is independently selected from the group consisting of hydrogen, a halogen, or an aliphatic group; wherein the aliphatic group(s) may have one or more halogen substituent(s).

The above summary of the present invention is not intended to describe each embodiment of the present invention. The details of one or more embodiments of the invention are also set forth in the description below. Other features, objects, and advantages of the invention will be apparent from the description and from the claims.

DETAILED DESCRIPTION

The present invention includes fluoropolymers comprising interpolymerized cure site units having one or more pendant amidoxime groups, pendant amidrazone groups, or combinations thereof.

In some embodiments, fluoropolymers of the present invention include interpolymerized units derived from one or more principal monomers, and, in some embodiments, at least two principal monomers. Examples of suitable principal monomers include perfluoroolefins (e.g., tetrafluoroethylene (TFE) and hexafluoropropylene (HFP)), halo-substituted fluoroolefins (e.g., chlorotrifluoroethylene (CTFE)), perhalovinyl ethers (e.g., perfluorovinyl ethers), perhaloallyl ethers (e.g., perfluoroallyl ethers), and hydrogen-containing monomers including, e.g., non-fluorinated olefins (e.g., ethylene, propylene, and the like) and partially-fluorinated, hydrogen-containing monomers (e.g., partially-fluorinated olefins, vinylidene fluoride (VDF) and vinyl fluoride).

In some embodiments, the fluoropolymer composition may include interpolymerized units derived from one or more ethylenically-unsaturated monomers represented by the formulas $CF_2=CF-R_f^1$, $CF_2=CF-O-R_f^2$, $CF_2=CF-CFX-O-R_f^2$, and $CH_2=CR_2$, wherein $R_f^1$ is a perhaloalkyl, $R_f^2$ is perhaloalkyl or a perhaloalkoxyalkyl, X is F or $R_f^2$, and each R is independently selected from the group consisting of hydrogen, a halogen (e.g., Cl or F), or an aliphatic group; wherein the aliphatic group(s) may have one or more halogen substituent(s). In some embodiments, $R_f^1$ and/or $R_f^2$ are perfluorinated. In some embodiments, $R_f^1$ is a perhaloalkyl containing 1-8 carbon atom(s). In some embodiments, $R_f^2$ is a perhaloalkyl or a perhaloalkoxyalkyl containing 1-8 carbon atom(s). In some embodiments, the fluoropolymer composition may include interpolymerized units derived from perfluorinated vinyl ethers including perfluoroalkyl vinyl ether(s) (PAVE) and perfluoroalkoxy vinyl ether(s) (PAOVE).

Suitable perfluorinated vinyl ethers include those of Formula 1:

$$CF_2=CFO(R'_fO)_a(R''_fO)_bR'''_f \qquad (1)$$

wherein $R'_f$ and $R''_f$ are the same or are different linear or branched perfluoroalkylene groups of 1-6 carbon atoms; and a and b are, independently, 0 or an integer from 1 to 10. In some embodiments, $R'''_f$ is a perfluoroalkyl of 1 to 8 carbon atoms(s), in some embodiments 1 to 4 carbon atom(s), or even one carbon atom. In some embodiments, $R'''_f$ is a perfluoroalkoxyalkyl of 1 to 15 carbon atom(s), in some embodiments, 1 to 8 carbon atom(s), and even 1-3 carbon atoms.

In some embodiments, the composition includes repeating units derived from perfluorinated vinyl ethers of Formula 2:

$$CF_2=CFO(CF_2CFXO)_nR_f \qquad (2)$$

wherein X is F or $CF_3$; n is 0-5, and $R_f$ is a perfluoroalkyl group of 1-8 carbon atom(s). In some embodiments, the perfluoroalkyl vinyl ethers are those wherein n is 0 or 1, and $R_f$ contains 1-3 carbon atoms.

Other useful perfluorinated monomers include compounds of Formula 3:

$$CF_2=CFO[(CF_2)_m(CFX)_cO]_dR_f \qquad (3)$$

wherein $R_f$ is a perfluoroalkyl group having 1-8 carbon atom(s), m is 1-5, c is 0-5, d is 0-5, and X is F or $CF_3$. In some embodiments, $R_f$ is $C_3F_7$ or $CF_3$, m is 1-2, c is 0-1, d is 1, and $X=CF_3$.

Additional useful perfluorinated monomers include those of Formula 4:

$$CF_2=CFO(CF_2CF(CF_3)O)_g(CF_2)_kO(CF_2)_pC_xF_{2x+1} \qquad (4)$$

wherein g is 0 or an integer from 1-10, k is an integer from 1-6, p is 0-3, and x is 1-5. In some embodiments, g is 0 or 1, k is 1-5, p is 0 or 1, and x is 1.

Additional perfluoroalkoxy vinyl ethers useful in the invention include those of the Formula 5:

$$CF_2=CFO(CF_2)_t[CF(CF_3)]_uO(CF_2O)_wC_xF_{2x+1} \qquad (5)$$

wherein t is 1-3, u is 0-1, w is 0-3, and x is 1-5, preferably 1.

Examples of perfluoroalkylvinyl ethers suitable for some embodiments of the present invention include perfluoromethyl vinyl ether, perfluoroethyl vinyl ether, and perfluoropropyl vinyl ether. Examples of perfluoroalkoxyvinyl ethers suitable for some embodiments of the present invention include 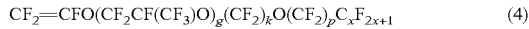 $CF_2=CFOCF_2OCF_2CF_2CF_3$, $CF_2=CFOCF_2OCF_2CF_3$, $CF_2=CFOCF_2OCF_3$, $CF_2=CFO(CF_2)_3OCF_3$, and $CF_2=CFOCF_2CF_2OCF_3$. Combinations of these and other perfluoroalkyl vinyl ethers and perfluoroalkoxy vinyl ethers may also be employed.

One example of a useful fluoropolymer is composed of principal monomer units of tetrafluoroethylene and at least one perfluoroalkylvinyl ether. In some embodiments, the copolymerized perfluoroalkyl vinyl ether units constitute at least about 10 mol %, in some embodiments, at least about 15 mol %, and, in some embodiments, at least about 30 mol % of the total monomer units present in the polymer. In some embodiments, the copolymerized perfluoroalkyl vinyl ether units constitute no greater than about 45 mol %, in some embodiments, no greater than about 40 mol %, and, in some embodiments, no greater than about 35 mol % of the total monomer units present in the polymer.

In some embodiments, fluoroelastomers of the present invention contain at least 50 mol % of interpolymerized units derived from TFE, CTFE, or HFP. In some embodiments, the balance of the interpolymerized units is derived from vinylethers and cure site monomers.

In some embodiments, the fluoropolymers of the present invention may contain interpolymerized units derived from one or more hydrogen-containing monomers, which may have halogen substituents (e.g., F or Cl). In some embodiments, partially fluorinated polymers of the present invention may contain 5-95 mol % units of VDF; 1-50 mol % propylene and/or ethylene; 95-4 mol % units of TFE, CTFE and/or HFP; up to 35 mol % units of vinyl ethers; and/or up to 5 mol % units of cure site monomers.

The polymers of the present invention comprise interpolymerized units having one or more pendant amidoxime structures (i.e., $-C(NR_2)=NOR$ and/or its tautomer $-C(NR-OR)=NR$), and/or pendant amidrazone structures (i.e., $-C(NR_2)=N-NR_2$ and/or its tautomer $-C(NR-NR_2)=NR$), wherein each R is independently selected from the group consisting of hydrogen, and linear or branched, substituted or unsubstituted, perfluorinated, partially-fluorinated, or non-fluorinated, alkyl or aryl groups, optionally containing one or more heteroatoms. In some embodiments, at least one R group is hydrogen. In some embodiments, all of the R groups are hydrogens.

In some embodiments, the amidoxime and/or amidrazone groups can be attached directly to the polymer backbone. In some embodiments, one or more of the amidoxime and/or amidrazone groups may be indirectly attached to the backbone via a substituted or unsubstituted, linear or branched, aliphatic chain interposed between the polymer backbone and the amidoxime and/or amidrazone group. In some embodiments, the amidoxime or amidrazone group is at the terminal position of the aliphatic group; however, the amidoxime or amidrazone group may be present at any position along the aliphatic chain.

In some embodiments, the amidoxime and/or amidrazone groups are attached to the polymer backbone via alkyl groups, e.g., $B-(CZ_2)_n-A$ wherein, A is an amidoxime or amidrazone; B represents the polymer backbone; each Z is independently selected from hydrogen, a halogen (e.g., F or Cl), or an aliphatic group (in some embodiments, an aliphatic group containing 1-8 carbon atoms), which aliphatic group may have halogen substituents; and n=1 to 50, in some embodiments, 1 to 20, or even 1 to 10. In some embodiments, the interposed alkyl chain is perfluorinated, in which case each Z is F.

In some embodiments, the amidoxime and/or amidrazone groups can also be attached by alkoxy side chains, e.g., 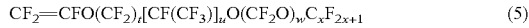 $B-(CZ_2)_n-(O-R^2)_m-(O-R^3)_p-(CZ_2)_q-CZX-A$, wherein $R^2$ and $R^3$ are independently selected from $C_1-C_{10}$ (in some embodiments, $C_1-C_5$) alkylenes, which may be linear or branched and which may be hydrogen-containing, partially-halogenated, partially-fluorinated, perhalogenated, or perfluorinated; n and m are each independently 1 to 50, in some embodiments, 1 to 20, or even 1 to 10; p is 0 to 10;

q is 0 to 10; each Z is independently a hydrogen, a halogen (e.g., F, Cl, or Br); and X is F or $CF_3$. In some embodiments, the alkoxy side chain is a perfluorinated alkoxy, in which case each Z is F, leading to, e.g., B—$(OCF_2)$—$(CF_2)_4$-A.

In some embodiments, the amidoxime or amidrazone structure is located at the terminal position of the alkyl or alkoxy side chain. In some embodiments, the amidoxime or amidrazone structure is located at any other position along the side chain. In some embodiments, the amidoxime or amidrazone structure is pendant to a branch on the side chain.

The level of amidoxime and/or amidrazone units in the overall fluoropolymer composition is that amount sufficient to provide the desired physical properties in a selected material after curing. In some embodiments, the level of amidoxime and/or amidrazone units is at least about 0.01 mol %, in some embodiments, at least about 0.1 mol %, in some embodiments, at least about 0.2 mol %, in some embodiments, at least about 0.5 mol %, or even at least about 0.7 mol %. In some embodiments, the level of amidoxime and/or amidrazone units is not greater than about 5 mol %, in some embodiments, not greater than about 3 mol % and, in some embodiments, not greater than about 1 mol %.

The amidoxime and/or amidrazone units may be introduced into the polymer by various means. In some embodiments, the amidoxime and/or amidrazone units are introduced into the polymer by copolymerization of monomers having pendant amidoxime and/or amidrazone structures. In some embodiments, pendant functional groups on the polymer backbone are converted into amidoxime and/or amidrazone units by, e.g., addition or substitution reactions.

Monomers having pendant amidoxime and/or amidrazone structures (e.g., a perfluorovinyl ether having an amidoxime or amidrazone group) can be prepared by a variety of methods. For example, exemplary methods of preparing monomers having amidrazone groups are described in "The chemistry of amidines and imidates," (S. Patai, Ed., John Wiley & Sons, Ltd., Vol. 1, pages 494-513 (1975)).

One method of preparing the desired monomers includes providing a monomer having a reactive group, and converting the reactive group into an amidoxime, an amidrazone, or a salt thereof. For example, in some embodiments, the reactive group can be the nitrile functionality of a nitrile-containing vinyl ether (e.g., $CF_2=CF_2$—O—$(CF)_n$—CN; n=1-10). In some embodiments, the nitrile group can be converted into an amidoxime structure by reacting a mixture (e.g., a 1:1 mixture) of vinyl ether and alcohol (e.g., methanol) in the presence of hydroxylamine or a salt thereof, e.g., an aqueous solution of hydroxylamine or a salt thereof. Similarly, in some embodiments, the nitrile group may be converted into an amidrazone structure by reacting a mixture (e.g., a 1:1 mixture) of a nitrile-containing vinyl ether and alcohol (e.g., methanol) in the presence of hydrazine or its salt, e.g., an aqueous solution of hydrazine or a salt thereof. Alternatively, in some embodiments, an amidoxime- or amidrazone-containing molecular fragment can be grafted onto a monomer using conventional grafting techniques.

In some embodiments, it may be desirable to polymerize amidoxime- and/or amidrazone-containing monomers, either as free amidoxime and/or amidrazones (i.e., —C(=N—OH)—$NH_2$) or as a salt (e.g., —C(=N—OH)—$NH_2$.HX, wherein HX=HCl, or another organic or inorganic free acid), via, e.g., aqueous or solvent polymerization. Solvent polymerization may be done, e.g., in nontelogenic organic solvents, such as haloperfluoro liquids, e.g., FREON R113 or FC75. Any soluble radical initiator can be used including, e.g., azobisisobutyronitrile (AIBN), potassium persulfate (KPS), ammonium persulfate (APS), and bis perfluoroacyl peroxides of the formula:

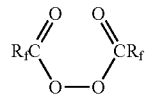

where Rf is a perfluoroalkyl or perfluoroalkoxyalkyl group. The polymerization is typically run at a temperature in the range of 25-80° C. and at a pressure in the range of 2-15 bar.

In some embodiments, the amidoxime and/or amidrazone structure can be introduced by converting nitrile-containing polymers into amidoxime and/or amidrazones. For example, the amidoxime and/or amidrazone can be introduced by reaction of a fluoropolymer containing repeat units derived from nitrile-containing cure site monomers with hydroxylamine or hydrazine (or salts thereof) to convert the nitrile group to an amidoxime or amidrazone, respectively. Alternatively, in some embodiments, an amidoxime- or amidrazone-containing molecular fragment can be grafted onto a polymer using conventional grafting techniques.

Using the technique of converting an already present nitrile functional group on a polymer backbone, the more convenient aqueous emulsion polymerization for preparing the polymer can be used. In addition, the conversion step of converting nitrile groups can be carried out in the presence of a swelling agent such as those described below.

In some embodiments, other functional groups (e.g., carboxyl groups, hydroxyl groups, acyl halide groups, amide groups, and imidate groups) may be converted into amidoxime and/or amidrazone groups. In some embodiments, the functional group is converted directly into an amidoxime and/or amidrazone group. In some embodiments, the functional group is converted into a nitrile group, which is then converted into an amidoxime and/or amidrazone group.

In some embodiments, monomers having convertible functional groups may be copolymerized to form the fluoropolymer backbone. Subsequently, the functional groups may be converted into amidoxime and/or amidrazone groups using any of a variety of techniques including those described above.

Nitrile containing fluoropolymers may be prepared by methods known in the art. For example, the polymerization process can be carried out by free-radical polymerization of the monomers as emulsions in water. In some embodiments, polymerization in an aqueous emulsion may be preferred because of the rapid and nearly complete conversion of monomers, easy removal of the heat of polymerization, and ready isolation of the polymer. Emulsion polymerization typically involves polymerizing monomers in an aqueous medium in the presence of an inorganic free-radical initiator system, such as ammonium persulfate or potassium permanganate, and a surfactant or suspending agent. Additionally, nitrile groups can be introduced through selected chain transfer agents like I—$(CF_2)_n$—CN, or by using a free-radical polymerization process carried out in the presence of a perfluorosulfinate such as CN—$(CF_2)_n$—$SO_2M$, where in the two preceding formulas n is an integer from 1 to 10, and, in some embodiments, 1 to 6; and wherein M represents a hydrogen atom or a cation with valence x, which is 1 or 2.

The amidoxime and/or amidrazone groups are preferably introduced by converting nitrile (—C≡N) groups in selected polymers into amidoxime and/or amidrazone groups. The preferred conversion route of nitrile containing fluoropolymers involves the reaction of nitriles in the presence of an alcohol component and suitable hydroxylamine or hydrazine at ambient temperatures.

In the case of perfluoroelastomers, at least one swelling agent may be added to the polymers. Such swelling agent(s), which support interaction between interfaces, can be a partially fluorinated compound such as a hydrofluoroether (HFE), (e.g., Novec™ Engineered Fluid HFE-7100 or 7200, commercially available from 3M Company, St. Paul, Minn.), or any other fluorine containing liquid, e.g., FC 75 (Fluorinert™ fluorocarbon solvent, also available from 3M Company). The conversion of the polymer pendant nitrile groups may be performed at room temperature or at higher temperatures (e.g., 100° C.). In general, any fluorine containing inert liquid or any fluorine containing alkanol with a boiling point of at least about 40° C., and in some embodiments, at least about 50° C. can be used. In the case of non-perfluorinated elastomers, a swelling agent also can be used. Exemplary swelling agents include alcohols, inert hydrocarbon solvents, and fluorinated compounds.

To convert the nitrile group(s), the mixture of polymer, swelling agent, alcohol, and hydroxylamine or hydrazine is normally refluxed, although the reaction proceeds at room temperature. In some embodiments, the hydroxylamine or hydrazine may be added as a salt. In some embodiments, the hydroxylamine or hydrazine may be added as an aqueous solution. Generally, the swelling agent and the alcohol are used to create a single-phase including the hydroxylamine and/or hydrazine, which swells the solid fluoropolymer. Generally, the amount of swelling agent and alcohol are not critical.

The amount of hydroxylamine and/or hydrazine may be selected based upon the desired conversion rate. In some embodiments, at least about 50% of the nitrile groups are converted into amidoxime and/or amidrazone functions, in some embodiments, at least about 60% of the nitrile groups, and in some embodiments, at least about 80% of the nitriles groups are converted. In some embodiments, substantially all of the nitrile groups are converted into amidoxime and/or amidrazone groups (e.g., greater than 90%, and in some embodiments, greater than 95%, or even greater than 99% of the nitrile groups are converted).

Complete conversion of the reactive groups (e.g., nitrile groups) to amidoxime and/or amidrazone groups is not necessary. For example, in some embodiments the ratio of unconverted reactive groups to amidoxime and/or amidrazone groups is greater than about 0.1, in some embodiments, greater than about 0.25, in some embodiments, greater than about 0.5, or even greater than about 0.9. In some embodiments the ratio of unconverted reactive groups to amidoxime and/or amidrazone groups is less than about 10, in some embodiments, less than about 5, in some embodiments, less than about 4, in some embodiments, less than about 2, or even less than about 1.1.

Generally, following conversion the polymer is isolated as a solid after removing the swelling agent and any solvents (e.g., alcohol) by, e.g., rinsing and drying (e.g., drying under vacuum).

In some embodiments, fluoropolymers comprising pendant amidoxime and/or pendant amidrazone groups are self-curable (i.e., the fluoropolymer may be cured even in the absence of added curatives and/or crosslinking agents). In some embodiments, heating the curable material to an elevated temperature cures the fluoropolymer compositions.

The fluoropolymer can also have interpolymerized cure site units having reactive groups other than the inventive amidoxime and/or amidrazone groups. For example, in some embodiments, the fluoropolymer can have nitrile groups or imidate groups. In some embodiments, nitrile groups may be introduced, e.g., by copolymerization of well known nitrile-containing vinylethers, such as $CF_2$=$CFO(CF_2)_LCN$; $CF_2$=$CFO(CF_2)_uOCF(CF_3)CN$; $CF_2$=$CF[OCF_2CF(CF_3)]_rO(CF_2)_tCN$; and $CF_2$=$CFO[CF_2CF(CF_3)O]_q(CF_2O)_yCF(CF_3)CN$, where L=2-12; u=2-6; r=1-2; t=1-4; q=0-4; and y=0-6. Representative examples of such monomers include $CF_2$=$CFO(CF_2)_3OCF(CF_3)CN$, perfluoro(8-cyano-5-methyl-3,6-dioxa-1-octene), and $CF_2$=$CFO(CF_2)_5CN$.

In some embodiments, the cure site monomer may include a pentafluorophenoxy group as described, e.g., in U.S. Pat. Nos. 3,467,638 and 3,682,872.

In some embodiments, the fluoropolymer can contain interpolymerized units derived from a monomer a halogen that is capable of participation in a peroxide cure reaction as a reactive group. Such a halogen may be present along a fluoropolymer chain and/or in a terminal position. In some embodiments, the halogen is bromine or iodine. Copolymerization is preferred to introduce the halogen in a position along a fluoropolymer chain. In this route, a selection of the fluoropolymer components mentioned above is combined with a suitable fluorinated cure site monomer. Such a monomer can be selected, for example, from the general formula Z-$R_fO_x$—CF=$CF_2$, wherein Z is Br or I; $R_f$ is a substituted or unsubstituted $C_1$-$C_{12}$ fluoroalkylene, which may be perfluorinated and which may contain one or more ether oxygen atoms; and x is 0 or 1. Exemplary cure site monomers include the bromo- or iodo-fluoroolefins including bromodifluoroethylene, bromotrifluoroethylene, iodotrifluoroethylene, 1-bromo-2,2-difluoroethylene, and 4-bromo-3,3,4,4-tetrafluorobutene-1, $BrCF_2OCF$=$CF_2$, $BrCF_2CF_2OCF$=$CF_2$, $BrCF_2CF_2CF_2OCF$=$CF_2$, $CF_3CF(Br)CF_2OCF$=$CF_2$, and the like. In addition, non-fluorinated bromo- or iodo-olefins, e.g., vinyl bromide and 4-bromo-1-butene, can be used.

In some embodiments, the amount of these additional interpolymerized cure site units is at least about 0.01, in some embodiments, at least about 0.1 mol %. In some embodiments, the amount of these additional cure site monomers is not greater than about 5 mol %, in some embodiments, not greater than about 3 mol %. In some embodiments, the molar ratio of interpolymerized cure site units having at least one pendant amidoxime group, pendant amidrazone group, or combinations thereof (i.e., the "first" interpolymerized cure site units) to interpolymerized cure site units having reactive groups other than the inventive amidoxime and/or amidrazone groups (i.e., the "second" interpolymerized cure site units) is greater than about 0.1, in some embodiments, greater than about 0.25, in some embodiments, greater than about 0.5, or even greater than about 0.9. In some embodiments the ratio of first interpolymerized cure site units to second interpolymerized cure site units is less than about 10, in some embodiments, less than about 5, in some embodiments, less than about 4, in some embodiments, less than about 3, or even less than about 1.1.

In some embodiments, second interpolymerized cure site units may comprise unreacted groups, i.e., reactive groups that were not converted into amidoxime and/or amidrazone groups.

In some embodiments, the fluoropolymers can be cured using one or more peroxide curatives. Suitable peroxide curatives generally include those that generate free radicals at curing temperatures. In some embodiments, dialkyl peroxide and bis(dialkyl peroxide), each of which decomposes at a temperature above 50° C., are especially preferred. In some embodiments, it is preferred to use a di-tertiarybutyl peroxide having a tertiary carbon atom attached to peroxy oxygen atom. Among the most useful peroxides of this type are 2,5-dimethyl-2,5-di(tertiarybutylperoxy)hex-3-yne and 2,5-dimethyl-2,5-di(tertiarybutylperoxy)hexane. Other peroxides can be selected from such compounds as dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate. In some embodiments, about 1 to 3 parts of peroxide per 100 parts of fluoropolymer (phr) is used.

In some embodiments, the fluoropolymer compositions can be cured using divalent metal amine complex catalysts, alone or in various combinations, as described in U.S. Pat. Nos. 6,657,012 and 6,657,013. Such divalent metal amine complex compounds are represented by the general formula:

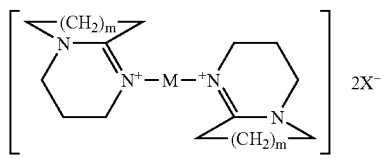

wherein M is a divalent metal, X is an anionic group, and n is 2 to 8, in some embodiments, 3 to 6, and even 3 or 5. Examples of suitable divalent metals include magnesium, nickel, zinc, cobalt, lead, iron, tin, cadmium, and calcium, with magnesium and zinc being preferred. Examples of suitable anionic groups include halide (e.g., chloride, bromide, or iodide), hydroxylate, alkoxylate, carboxylate, phenoxide, sulfonate, sulfate, sulfite, carbonate, and nitrate groups, with halides such as chlorides being preferred. This formula includes, for example, complexes of 1,8-diazabicyclo[5,4,0]undec-7-ene (DBU) and 1,5-diazabicyclo[4,3,0]non-5-ene (DBN). These complexes may be prepared, for example, by reacting DBU or DBN with a metal salt (e.g., a metal halide) in an organic solvent such as methanol or acetone according to the procedure described in U.S. Pat. No. 4,833,212. In some embodiments, more than one such complex can be used.

Other suitable catalysts include those described in U.S. Patent Publications US20020177666; and US 20020145228 (both allowed).

In some embodiments, the amount of curative is at least about 0.01 parts per hundred parts fluoropolymer (phr), and, in some embodiments, at least about 0.5 phr. In some embodiments, the amount of curative is not greater than about 10 phr, in some embodiments, not greater than 5 phr, and, in some embodiments, not greater than 3 phr.

The fluoropolymer compositions can include any of the adjuvants commonly employed in curable fluoropolymer formulations. For example, one material often blended with a fluoropolymer composition as a part of the peroxide curative system, is a coagent (sometimes also referred to as a co-curative) composed of a polyunsaturated compound that is capable of cooperating with the curative to provide a useful cure. These coagents can generally be added in an amount equal to between 0.1 and 10 parts coagent per hundred parts fluoropolymer (phr), preferably between 1 and 5 phr. Examples of useful coagents include triallyl cyanurate; triallyl isocyanurate; tri(methylallyl)isocyanurate; tris (diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bisolefins disclosed in EP 0 661 304 A1, EP 0 784 064 A1, EP 0 769 521 A1, and U.S. Pat. No. 5,585,449.

The fluoropolymer compositions can also be cured by using other types of curatives along with the integral amidoxime and/or amidrazone when the undesirable features of the known curing system are tolerable. Examples of such curatives are known and include bis-aminophenols (e.g., as described in U.S. Pat. Nos. 5,767,204 and 5,700,879), bis-amidooximes (e.g., as described in U.S. Pat. No. 5,621,145), and ammonium salts (e.g., as described in U.S. Pat. No. 5,565,512). Organometallic compounds of arsenic, antimony, and tin also can be used; for example, as described in U.S. Pat. Nos. 4,281,092; and 5,554,680. Particular examples include allyl-, propargyl-, allenyl-, tetraphenyl-, and triphenyl-tin hydroxide.

In addition, the integral amidoxime and/or amidrazone cure system can be modified by a variety of methods. For example, ammonia-generating compounds may be included to modify the rate of cure of a particular composition, although such modification may also remove one or more advantages of the present invention. Such ammonia-generating compounds are typically solid or liquid at ambient conditions, and then generate ammonia under conditions of cure. These compounds include, for example, hexamethylene tetramine (urotropin) and dicyandiamide, as well as metal-containing compounds and triazine derivatives. More detail regarding such ammonia-generating compounds is found in U.S. Pat. No. 6,281,296.

It may be advantageous for tailoring processing properties and final end properties to add one or more onium salts to the fluoropolymer compositions. Examples of suitable onium salts are described in U.S. Pat. No. 4,882,390. Specific examples include triphenylbenzyl phosphonium chloride, tributyl alkyl phosphonium chloride, tributyl benzyl ammonium chloride, tetrabutyl ammonium bromide, and triarylsulfonium chloride.

Additives, such as stabilizers, plasticizers, lubricants, fillers, and processing aids typically utilized in fluoropolymer compounding, can be incorporated into the compositions, provided they have adequate stability for the intended service conditions. In particular, low temperature performance can be enhanced by incorporation of perfluoropolyethers. See, e.g., U.S. Pat. Nos. 5,268,405; 6,255,536; and 6,294,627.

Carbon black fillers are typically also employed in fluoropolymers as a means to balance modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When large size particle black is used, 1 to 70 parts filler per hundred parts fluoropolymer (phr) is generally sufficient.

Fluoropolymer fillers may also be present in the curable compositions. Generally, from 1 to 50 phr of fluoropolymer filler is used. The fluoropolymer filler can be finely divided and easily dispersed as a solid at the highest temperature used in fabrication and curing of the inventive composition. By solid, it is meant that the filler material, if partially crystalline, will have a crystalline melting temperature above the processing temperature(s) of the curable composition(s). The preferred way to incorporate fluoropolymer filler is by blending latices. This procedure, including various kinds of fluoropolymer filler, is described in U.S. Pat. No. 6,720,360.

One or more acid acceptors can also be added to the formulations. However, where the presence of extractable metallic compounds is undesirable (such as for semiconductor applications), the use of inorganic acid acceptors should be minimized, and preferably avoided altogether. Commonly used acid acceptors include, for example, zinc oxide, calcium hydroxide, calcium carbonate, magnesium oxide, etc. These compounds generally are used in the fluoropolymer formulation to bind any HF or other acids that might be generated at the high temperatures where the fluoropolymers are intended to function.

The curable fluoropolymer compositions of the invention may also be combined with other curable fluoropolymer compositions such as peroxide-curable fluoropolymer compositions. These additional curable fluoropolymer compositions typically employ small amounts of cure site monomers as a comonomer. Suitable cure site monomers are those which, when combined with a curative (e.g., a peroxide), and preferably a coagent, will provide a cured composition. Preferably, these cure site monomers include at least one halo group (e.g., a bromo or an iodo group).

The curable fluoropolymer compositions can be prepared by mixing the fluoropolymer, and, optionally, catalyst(s), additive(s), additional curative(s), and other adjuvant(s), if any, in conventional rubber processing equipment. The desired amounts of compounding ingredients and other conventional adjuvants or ingredients can be added to the curable fluorocarbon gum stock and intimately admixed or compounded therewith by employing any of the usual rubber mixing devices such as internal mixers, (e.g., Banbury mixers), roll mills, or any other convenient mixing device. In some embodiments, the temperature of the mixture during the mixing process should not rise above about 120° C. In some embodiments, it is preferable to distribute the components and adjuvants uniformly throughout the gum during mixing for effective cure.

In some embodiments, the mixture is then processed and shaped (e.g., in the shape of a hose or hose lining, a seal, a gasket, or an O-ring seal) by, e.g., extrusion or molding. In some embodiments, the shaped article can then be heated to cure the gum composition and form a cured article.

In some embodiments, the mixture may be press cured. Pressing of the compounded mixture usually is conducted at a temperature sufficient to cure the mixture within a desired time under a suitable pressure. In some embodiments, the temperature is at least about 95° C., in some embodiments, at least about 150° C. In some embodiments, the temperature is not greater than about 230° C., in some embodiments, not greater than about 205° C. In some embodiments, the desired time is between about 1 minute and 15 hours, in some embodiments, between about 5 minutes and 30 minutes. In some embodiments, a pressure of between about 700 kPa and about 20,600 kPa is imposed on the compounded mixture in a mold. The molds first may be coated with a release agent and prebaked. The molded vulcanizate is then usually post-cured (e.g., in an oven) at a temperature and for a time sufficient to complete the post-curing, usually between about 150° C. and about 300° C., typically at about 232° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably about 300° C., and this value is held for about 4 hours or more.

The fluoropolymer compositions are useful in production of articles such as O-rings, gaskets, tubing, hoses, hose linings, and seals. Such articles are produced by molding a compounded formulation of the fluoropolymer composition with various additives under pressure, curing the article, and then subjecting it to a post-cure cycle. The curable compositions formulated without inorganic acid acceptors are particularly well suited for applications such as seals and gaskets for manufacturing semiconductor devices, and in seals for high temperature automotive uses.

The invention will now be described further by way of the following examples.

EXAMPLES

Test Methods

In the following examples, the indicated results were obtained using the following test methods.

Cure rheology tests were run on uncured, compounded samples using a Monsanto Moving Die Rheometer (MDR) Model 2000 in accordance with ASTM D 5289-93a at 177° C. (temperature unless otherwise noted), no pre-heat, 30 minute elapsed time, and a 0.5 degree arc. Both the minimum torque (ML) and highest torque attained during a specified period of time when no plateau or maximum torque was obtained (MH) were measured. Also measured were the time for the torque to reach a value equal to ML+0.5(MH−ML), (t50), and the time for the torque to reach ML+0.9(MH−ML), (t90).

Unless otherwise noted, all parts, percentages, ratios, etc. in the examples and the rest of the specification are by weight, and all reagents used in the examples were obtained, or are available, from general chemical suppliers such as Sigma-Aldrich Company, Saint Louis, Mo., or Aldrich Chemicals, Milwaukee, Wis.; or may be synthesized by conventional methods.

FT-IR spectroscopy (Nicolet Magna 560 FT-IR Spectrometer) was used to determine the percent conversion of nitrile groups using film 0.3 to 0.4 mm thick. The mol % of nitrile groups was determined by the following equation $$\text{Nitrile mol \%} = 2.62 * \left( \frac{\text{nitrile peak height at 2263 cm}^{-1}}{C-F \text{ overtone peak height at 2359 cm}^{-1}} \right).$$

The following abbreviations are used throughout the Examples:

| Abbreviation | Description |
| --- | --- |
| TFE | tetrafluoroethylene |
| PMVE | perfluoromethylvinyl ether |
| MV5CN | CF2=CFO(CF2)5CN |
| HFE-7100 | Novec ™ Engineered Fluid HFE-7100 commercially available from 3M Company, St. Paul, MN (swelling agent) |
| THF | tetrahydrofuran |
| Fluoropolymer A | A perfluoroelastomer of 65.7 mol % tetrafluoroethylene (TFE), 33.0 mol % perfluoromethyl perfluorovinyl ether (PMVE) and 1.3 mol % CF2=CFO(CF2)5CN (MV5CN) was prepared by aqueous emulsion polymerization. The Mooney viscosity (ML 1 + 10, 121° C.) was about 80 |

| Abbreviation | Description |
|---|---|
| | (ASTM D-1646). |
| Curative A | See "Curative Preparation" below. |
| Curative B | See "Curative Preparation" below. |
| urotropin | hexamethylene tetramine |

Curative Preparation

Curative A: Perfluoroadiponitrile Bisamidine

NH2(NH═)C(CF2)4C(═NH)NH2

A 4 L plastic flask equipped with magnetic stirring was charged with methanol (188 g, 5.9 mol). Perfluoroadipoyl fluoride (454 g, 1.5 mol; available from Exfluor Research Corp. (Austin, Tex.)) was added over one hour. A caustic scrubber was used for treating the hydrofluoric acid byproduct. Perfluoroadipate (446 g, 1.4 mol) was isolated by addition of water followed by distillation of the lower fluorochemical product phase. A 2 L flask equipped with a mechanical stirrer was charged with the perfluoroadipate (446 g, 1.4 mol) in methanol, which was reacted with an excess of ammonia (54 g, 3.2 mol) to give perfluoroadipoyl amide (385 g, 1.3 mol, after vacuum drying). A 3 L flask with a mechanical stirrer was charged with a solution of the perfluoroadipoyl amide (385 g, 1.3 mol) in dimethylformamide, which was reacted at −10° C. first with pyridine (508 g, 6.4 mol) followed by trifluoroacetic anhydride (674 g, 3.2 mol). Perfluoroadiponitrile (235 g, 0.9 mol) with a 64° C. boiling point was isolated by addition of water followed by distillation of the lower fluorochemical product phase. A 1 L flask equipped with a mechanical stirrer was charged with the perfluoroadiponitrile (108 g, 0.4 mol) in diethyl ether and reacted at −10° C. with ammonia (17 g, 1.0 mol) to give perfluoroadiponitrile bisamidine (112 g, 0.9 mol, after vacuum drying) having a melting point of 132° C. The structure was confirmed by fluorine and proton NMR.

Curative B: Di-Acetic Acid Salt of Perfluorotetraethylene Oxide Dinitrile Bisamidine

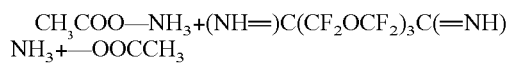

$CH_3COO—NH_3+(NH═)C(CF_2OCF_2)_3C(═NH)NH_3+—OOCCH_3$

Fifty-five grams of a 4.7% w/w ammonia in methanol mixture (0.15 mol ammonia) were added dropwise to a round-bottomed flask containing 73 g of methyl perfluorotetraethylene oxide dimethyl ester (0.14 mol, 87%; prepared as described in U.S. Pat. No. 5,488,142) while cooling with an ice bath. The temperature was maintained at 40° C. and titration was continued until the IR absorbance of the methyl ester carbonyl disappeared. Sixty-seven grams (0.14 mol) of perfluorotetraethylene oxide diamide was recovered after solvent removal (40° C./55 mm Hg, then 40° C./0.1 mm Hg). NMR analysis indicated 98% bisamide, 1.4% bisester, and 0.4% methanol.

Sixty-one grams (0.14 mol) of the of the bisamide was dissolved in 80 mL of THF, dried over MgSO$_4$, filtered into a 1 L round-bottom flask using three 20 mL THF washes, and cooled under nitrogen to −20° C. Fifty-three grams (0.67 mol) of anhydrous pyridine was added to the stirred solution. Seventy-one grams (0.34 mol) of trifluoroacetic anhydride was added over 70 minutes while maintaining the temperature at −5 to −10° C. The reaction mixture was warmed to ambient temperature over two hours. One hundred mL of Freon F-113 (E. I. du Pont de Nemours & Co., Wilmington, Del.) was added and the solution was washed multiple times with saturated brine. A 70% crude yield was estimated by gas chromatography. The bisnitrile was purified by short path distillation (103 to 107° C.) and characterized by fluorine NMR.

Twelve grams of the bisnitrile (23 mmol) in 10 mL of HFE 7100 was titrated with anhydrous ammonia until no nitrile stretch was observed by IR (2269 cm$^{-1}$). Acetic acid (2.8 g, 46 mmol) was added to the solution and the contents transferred to a larger round-bottomed flask. Solvents were removed by rotary evaporation to a final weight of 20.3 g of the di-acetic acid salt of perfluorotetraethylene oxide dinitrile bisamidine.

Examples 1a-1d

Pendant Amidrazone

A 2 L, three-necked, glass flask with condenser and stirrer were charged with 300 g of Fluoropolymer A, 400 g of HFE-7100, 450 g of methanol, and 6.4 g of 25 wt % hydrazine in water. After 3 hours of stirring at room temperature, the reaction was terminated. The sample was dried for 15 hours at 50° C. and then further dried for 3 hours under vacuum. The conversion of nitrile groups into amidrazone groups was monitored via FT-IR measurements at 2264 cm$^{-1}$ for the —CN absorption and at 1660 (1610-1680 cm$^{-1}$) and 1571 cm$^{-1}$ for the amidrazone absorption. The FT-IR spectrum showed significant reduction of nitrile content (0.9 mol % remaining). For Examples 1a-1d, samples were press cured for 12 minutes at the temperatures shown in Table 1. Example 1a was cured without additional curative. Example 1b was cured using 2 phr of Curative A. Example 1c was cured with 2 phr of Curative B. Example 1d was cured with 1 phr urotropin. The post-cure program was 200° C. for 24 hours followed by 300° C. for 8 hours.

Rheology data for these cured samples are presented in Table 1. For each sample, FT-IR clearly showed a triazine peak at 1556 cm$^{-1}$.

Example 2

Pendant Amidoxime

A 2-L, three-necked, glass flask with condenser and stirrer were charged with 300 g of Fluoropolymer A, 1000 g of HFE-7100, 800 g of methanol, and 50 g of 50 wt % hydroxylamine in water. After 6 hours of stirring at 47° C., the reaction was terminated. The sample was dried for 15 hours at 50° C. and then further dried for another 3 hours under vacuum. The conversion of nitrile groups into amidoxime groups was monitored via FT-IR measurements. The FT-IR spectrum (2264 cm$^{-1}$) showed no evidence of the nitrile groups, and new peaks appeared at 1581 and 1685 cm$^{-1}$, which belong to the expected amidoxime structure. The sample was press cured without additional curative. Rheology data is provided in Table 1.

The polymer molded as a crystal clear MDR slug.

Example 3

Pendant Amidoxime

A 2 L, three-necked, glass flask with condenser and stirrer were charged with 300 g of Fluoropolymer A, 125 g of HFE-7100, 500 g of methanol and 2.6 g of 50 wt % hydroxylamine in water. After 20 hours of stirring at 20° C., the reaction was terminated. The sample was dried for 15 hours at 80° C. and then further dried for 3 hours under vacuum. The conversion of nitrile groups into amidoxime groups was monitored via FT-IR measurements at 2264 cm$^{-1}$ for the CN absorption and at 1686-1692 cm$^{-1}$ for the amidoxime absorption. The FT-IR spectrum showed significant reduction of nitrile content (0.5 mol % remaining).

TABLE 1

|  | 1a | 1b | 1c | 1d | 2 |
|---|---|---|---|---|---|
| Curative | None | A (2 phr) | B (2 phr) | Urotropin (1 phr) | None |
| Temperature | 177° C. | 177° C. | 188° C. | 177° C. | 188° C. |
| ML (N · m) | 0.116 (1.03 in · lb) | 0.103 (0.91 in · lb) | 0.068 (0.60 in · lb) | 0.150 (1.33 in · lb) | 0.533 (4.72 in · lb) |
| MH (N · m) | 0.171 (1.51 in · lb) | 0.179 (1.58 in · lb) | 0.107 (0.95 in · lb) | 0.220 (1.95 in · lb) | 0.737 (6.52 in · lb) |
| t50 (min) | 4.97 | 6.29 | 5.65 | 5.78 | 4.71 |
| t90 (min) | 9.19 | 10.74 | 9.96 | 10.36 | 8.78 |

A number of embodiments of the invention have been described. Nevertheless, it will be understood that various modifications may be made without departing from the spirit and scope of the invention.

What is claimed is:

1. A fluoropolymer comprising first interpolymerized cure site units, wherein the cure site units have at least one pendant amidoxime group, pendant amidrazone group, or combinations thereof.

2. The fluoropolymer of claim 1, wherein the fluoropolymer comprises interpolymerized units derived from at least one monomer selected from tetrafluoroethylene, chlorotrifluoroethylene, $CF_2=CF-R_f^1$, $CF_2=CF-O-R_f^2$, $CF_2=CF-CFX-O-R_f^2$, and $CH=CR_2$, wherein $R_f^1$ is a perhaloalkyl, $R_f^2$ is perhaloalkyl or a perhaloalkoxyalkyl, X is F or $R_f^2$, and each R is independently selected from the group consisting of hydrogen, a halogen, or an aliphatic group; wherein the aliphatic group(s) may have one or more halogen substituent(s).

3. The fluoropolymer of claim 2, wherein the fluoropolymer comprises interpolymerized units derived from at least one monomer of the formula $CF_2=CF-R_f^1$ selected from perfluoromethyl vinyl ether, perfluoroethyl vinyl ether, perfluoropropyl vinyl ether, and combinations thereof.

4. The fluoropolymer of claim 2, wherein the fluoropolymer comprises interpolymerized units derived from at least one monomer of the formula $CF_2=CF-O-R_f^2$ selected from $CF_2=CFOCF_2OCF_2CF_2CF_3$, $CF_2=CFOCF_2OCF_2CF_3$, $CF_2=CFOCF_2OCF_3$, $CF_2=CFO(CF_2)_3OCF_3$, $CF_2=CFOCF_2CF_2OCF_3$, and combinations thereof.

5. The composition of claim 2, wherein from about 10 to about 45 mol % of total interpolymerized units present in the fluoropolymer comprise one or more perfluorovinyl ethers.

6. The fluoropolymer of claim 1, further comprising second interpolymerized cure site units, optionally wherein the second interpolymerized cure site units have a reactive group selected from a nitrile group, an imidate group, a pentafluorophenoxy group, bromine, iodine, and combinations thereof.

7. The fluoropolymer of claim 6, wherein the reactive group is a nitrile group, and the molar ratio of the first interpolymerized cure site units to the second interpolymerized cure site units is between about 0.5 and about 2, optionally wherein the molar ratio is between about 0.9 and about 1.1.

8. The fluoropolymer of claim 6, wherein the molar ratio of the first interpolymerized cure site units to the second interpolymerized cure site units is between about 0.25 and about 4.

9. The fluoropolymer of claim 1, wherein the fluoropolymer comprises at least 50 mol % of interpolymerized units derived from at least one of tetrafluoroethylene, chlorotrifluoroethylene, and hexafluoropropylene.

10. The fluoropolymer of claim 1, wherein the fluoropolymer comprises interpolymerized units derived from one or more hydrogen-containing monomers, which may have F or Cl substituents.

11. The fluoropolymer of claim 1, wherein the fluoropolymer comprises interpolymerized units derived from monomers selected from perfluoroolefins, partially-fluorinated olefins, non-fluorinated olefins, vinylidene fluoride, and combinations thereof.

12. The fluoropolymer of claim 1, wherein the amount of interpolymerized units having pendant amidoxime and/or amidrazone groups is between about 0.01 mol % and about 5 mol %.

13. A composition comprising the fluoropolymer of claim 1 and one or more curatives, catalysts, and/or coagents.

14. An article comprising the fluoropolymer of claim 1, optionally wherein the article is a hose, a hose lining, a seal, a gasket, or an O-ring, and optionally wherein the fluoropolymer is at least partially cured.

15. A method of making an article comprising shaping the fluoropolymer of claim 1 and optionally curing the shaped fluoropolymer.

* * * * *

UNITED STATES PATENT AND TRADEMARK OFFICE
CERTIFICATE OF CORRECTION

PATENT NO. : 7,300,985 B2
APPLICATION NO. : 11/018539
DATED : November 27, 2007
INVENTOR(S) : Werner M. A. Grootaert It is certified that error appears in the above-identified patent and that said Letters Patent is hereby corrected as shown below:

Title Page, Col. 2 under (Other Publications)
Line 2, after "Ltd.," insert -- ) --.

Title Page, Col. 2 under (Other Publications)
Line 7, delete "-Containg" and insert -- -Containing --, therefor.

Title Page, Col. 2 under (Other Publications)
Line 23, delete "Technolgoy," and insert -- Technology, --, therefor.

Column 5
Lines 61-62, delete "-C(=N-OH)-NH$_2$.HX," and insert -- "-C(=N-OH)-NH$_2$·HX, --, therefor.

Column 8
Line 25, delete "Z-R$_f$O$_x$-CF=CF$_2$," and insert -- Z-R$_f$-O$_x$-CF=CF$_2$, --, therefor.
Line 29, delete "iodo-fluorolefins" and insert -- iodo-fluoroolefins --, therefor.
Line 51, delete "·greater" and insert -- greater --, therefor.

Column 10
Lines 11-12 (Approx.), delete "bis-amidooximes" and insert -- bis-amidoximes --, therefor.

Column 11
Line 1, delete "latices." and insert -- lattices. --, therefor.

Column 12
Line 57 (Approx.), delete "CF2=CFO(CF2)5CN" and insert -- CF$_2$=CFO(CF$_2$)$_5$CN --, therefor.
Line 64 (Approx.), delete "CF2=CFO(CF2)5CN" and insert -- CF$_2$=CFO(CF$_2$)$_5$CN --, therefor.

Column 13
Line 13, delete "NH2(NH=)C(CF2)4C(=NH)NH2" and insert
-- NH$_2$(NH=)C(CF$_2$)$_4$C(=NH)NH$_2$ --, therefor.

UNITED STATES PATENT AND TRADEMARK OFFICE
CERTIFICATE OF CORRECTION

PATENT NO. : 7,300,985 B2
APPLICATION NO. : 11/018539
DATED : November 27, 2007
INVENTOR(S) : Werner M. A. Grootaert It is certified that error appears in the above-identified patent and that said Letters Patent is hereby corrected as shown below:

Column 15, Line 34
In Claim 2, delete "$CH=CR_2$," and insert -- $CH_2=CR_2$, --, therefor.

Signed and Sealed this

Twentieth Day of May, 2008

JON W. DUDAS
*Director of the United States Patent and Trademark Office*